United States Patent
Yntema

(10) Patent No.: US 7,826,636 B2
(45) Date of Patent: Nov. 2, 2010

(54) VISUAL WATERMARK IN BOTH DATA AREA AND INNER-RING OF RECORD CARRIER

(75) Inventor: Gertjan Yntema, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 381 days.

(21) Appl. No.: 10/597,248

(22) PCT Filed: Jan. 21, 2005

(86) PCT No.: PCT/IB2005/050247
§ 371 (c)(1),
(2), (4) Date: Jul. 18, 2006

(87) PCT Pub. No.: WO2005/071677
PCT Pub. Date: Aug. 4, 2005

(65) Prior Publication Data
US 2008/0226117 A1  Sep. 18, 2008

(30) Foreign Application Priority Data
Jan. 23, 2004  (EP) ................... 04100249

(51) Int. Cl.
*G06K 9/00* (2006.01)
*G11B 7/24* (2006.01)

(52) U.S. Cl. ............... 382/100; 382/232; 382/240; 369/275.1; 369/275.4; 369/59.24; 369/59.11; 713/176

(58) Field of Classification Search ............ 382/100, 382/232, 240; 713/168, 176, 179, 193; 369/275.1, 369/275.3, 275.4, 47.21, 47.22, 53.21, 84; 380/250, 200–242; 726/2, 28
See application file for complete search history.

(56) References Cited

U.S. PATENT DOCUMENTS

| | | | | |
|---|---|---|---|---|
| 5,608,717 A | * | 3/1997 | Ito et al. | 369/275.3 |
| 5,748,607 A | * | 5/1998 | Ohira et al. | 369/275.4 |
| 6,088,323 A | * | 7/2000 | Kobayashi et al. | 369/275.3 |
| 6,370,319 B1 | * | 4/2002 | Matsumoto et al. | 386/94 |
| 6,754,158 B1 | * | 6/2004 | Kobayashi et al. | 369/59.11 |
| 6,973,015 B1 | * | 12/2005 | Murakami et al. | 369/47.21 |
| 7,007,165 B1 | * | 2/2006 | Tsuria | 713/176 |
| 7,263,201 B2 | * | 8/2007 | Yntema et al. | 382/100 |
| 7,538,787 B2 | * | 5/2009 | Lambert et al. | 347/224 |
| 2001/0046198 A1 | * | 11/2001 | Morioka et al. | 369/59.18 |

FOREIGN PATENT DOCUMENTS

EP    0903943    *    3/1999

(Continued)

*Primary Examiner*—Wesley Tucker
*Assistant Examiner*—Nancy Bitar

(57) ABSTRACT

A record carrier including a data area for storing data in the form of marks, in which the data is encoded by means of a channel code, wherein a parameter of the channel code is controlled so as to introduce a predetermined run length distribution in the marks on the record carrier, thereby introducing first information relating to a watermark, and a non-data area comprising second information relating to a watermark, the first and the second information forming the watermark. This watermark, extending over the data-area and the inner-ring area and/or the outer-ring area, can be used for checking the authenticity of the record carrier and/or the recordings made on this record carrier.

13 Claims, 3 Drawing Sheets

FOREIGN PATENT DOCUMENTS

Figure 1:
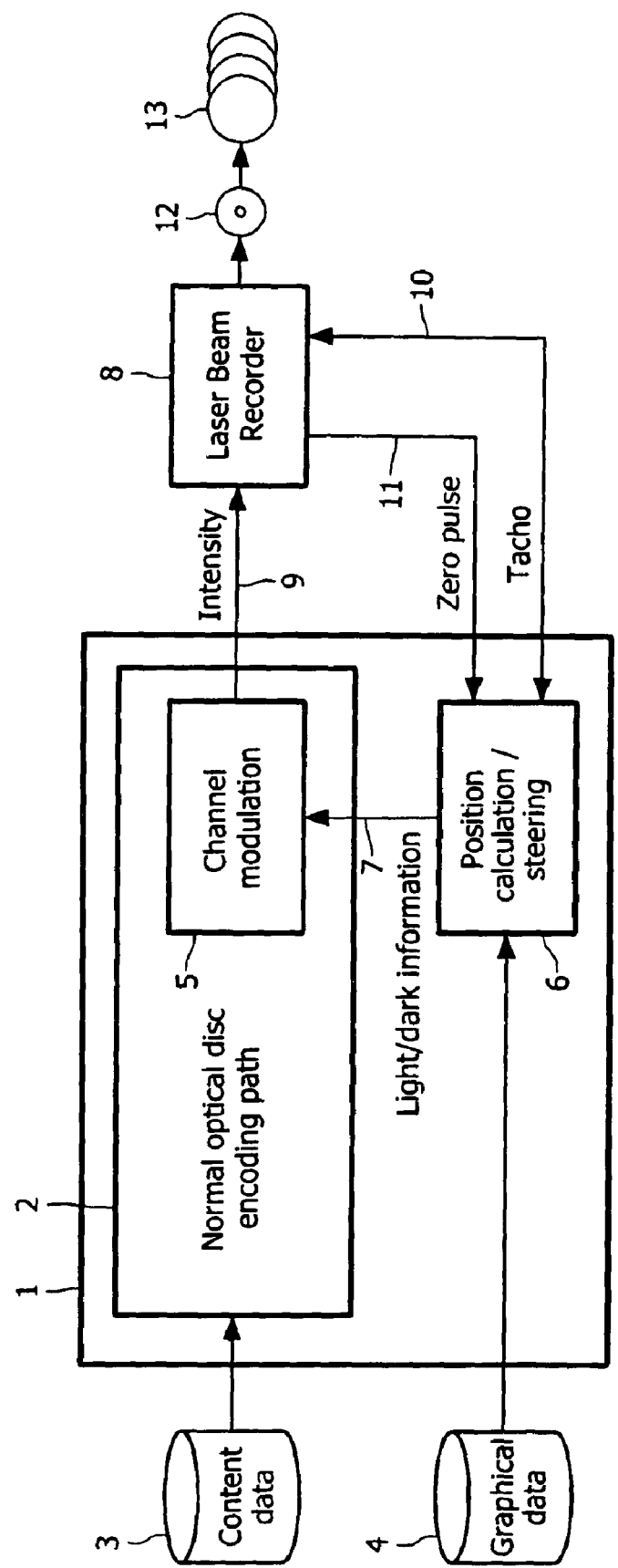

| | | | |
|---|---|---|---|
| EP | 1079381 | * | 6/1999 |
| EP | 0997899 | * | 5/2000 |
| JP | 200163883 A | | 6/2000 |
| JP | 2002123983 A | | 4/2002 |
| WO | WO 9808180 | * | 2/1998 |
| WO | 0241316 A1 | | 5/2002 |

* cited by examiner

VISUAL WATERMARK IN BOTH DATA AREA AND INNER-RING OF RECORD CARRIER

The invention relates to a record carrier carrying a watermark and a method of providing such a watermark on a record carrier.

In WO 02/41316 (PH-NL010604) a visual watermarking technique is described which can be used for adding a watermark to the data area of record carrier, e.g. a CD disc or a DVD disc. Due to the way the watermark is added, the available data capacity is not negatively influenced. The text of WO 02/41316 is hereby included by reference.

This watermark is introduced by controlling a parameter of the channel code which is used for encoding the data to be stored on the record carrier. In the case the channel code used is the EFM channel code as used for the CD Digital Audio disc, as control parameter the choice of merging bits can be used. In the case the channel code used is the EFM+ channel code as used in DVD, as control parameter the choice between channel words for information words from alternative tables, for example, information words 1 up to and including 88, or the choice between sync words or the choice between states can be used.

Due to this controlling of a channel coding parameter, a predetermined run length distribution is introduced in the marks on the record carrier. This creates a watermark on the record carrier. By providing the watermark on the record carrier in this way, it is possible to provide a watermark at the same position as that of the data, i.e. the data and the watermark are merged. This in contrast to existing mastering techniques where a data area cannot contain a watermark. Consequently, this watermark is not at the expense of the available data capacity of the record carrier.

The introduction of such a predetermined run length distribution in the marks on the record carrier results in differences of brightness which ensure that a watermark is detectable on the record carrier. These brightness differences are caused by the fact that pits with short run lengths reflect light at different angles than pits with longer run lengths. When providing the watermark, the encoded data itself is of course not changed. As it were, the watermark is interwoven in the encoded data.

A word, for example, a trade name may be chosen as a visually detectable watermark. Such a watermark may be used, for example, to indicate the originality of the record carrier. Moreover, a visually detectable watermark may also have a marketing function because the appearance of a record carrier is positively influenced, for example, by placing an image of the relevant artist in the watermark on a music CD. Moreover, recording of a word on the record carrier may render printing of the upper side of the record carrier superfluous. This reduces the production costs of the record carrier.

Although such a watermark can thus be used for checking the authenticity of a recording on the record carrier, it always remains possible that the algorithm for calculating the required predetermined run length distribution will be hacked. In that case, the presence of the correct watermark cannot be used anymore as authenticity prove.

It is therefore an object of the present invention to realise a record carrier carrying a more robust watermark.

To this end the record carrier according to the present invention comprises a data area for storing data in the form of marks, in which the data is encoded by means of a channel code, wherein a parameter of the channel code is controlled so as to introduce a predetermined run length distribution in the marks on the record carrier, thereby introducing first information relating to a watermark, and a non-data area comprising second information relating to a watermark, the first and the second information forming the watermark. The object is thus realised by expanding the information that is embedded using this watermark technology into the non-data areas of the record carrier.

In a preferred embodiment of the record carrier according to the invention, the first and the second information forming the watermark are orientated with respect to each other using, more preferably using position information present in the non-data area. In the mastering processes of the record carrier, the non-data area, is generally recorded during a separate phase during mastering; this recording can be performed by a Laser Beam Recorder, but also by the encoder used for encoding the data to be stored in the data area of the record carrier. In this case, since the non-data area can be recorded using the same encoder, the parts forming the watermark can be more easily orientated with respect to each other. The second information can comprise the same kind of information as the first information present in the data area, but can also be different, e.g. the first information can comprise picture information, whereas the second information comprises text information. The orientation can be performed using position information present in the non-data area.

In a further embodiment, the record carrier further comprises angle information indicating a predetermined angle between the first information and the second information. This angle information can be used as a further (in addition to the watermark) authentication check.

In a further embodiment, the non-data area is an inner-ring area of the record carrier and/or an outer-ring area of the record carrier, the inner-ring area, for example, being a graphics band, text band, matrix band or identification band. With the terms "inner-ring area" and "outer-ring" area the areas on the record carrier outside the area intended for data recording are intended.

The first and second information can be both visually or non-visually detectable; one way of making the first information present in the data area visually detectable is to correlate the predetermined run length distribution from track to track. Non-visually detectable second information can, for example, be in the form of microtext written in the inner-ring area of the record carrier.

The invention further relates to a method of providing a watermark on such a record carrier.

These and other aspects of the invention are apparent from and will be elucidated with reference to the embodiments described hereinafter.

Figure 2:
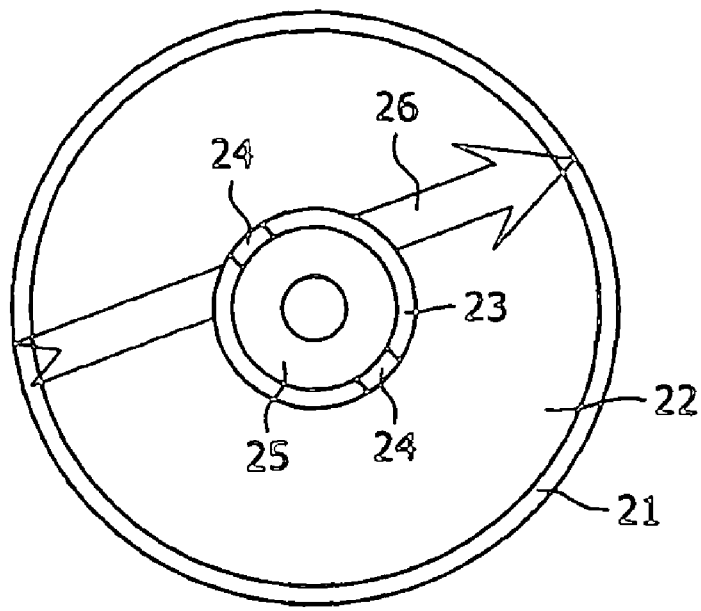
Figure 3:
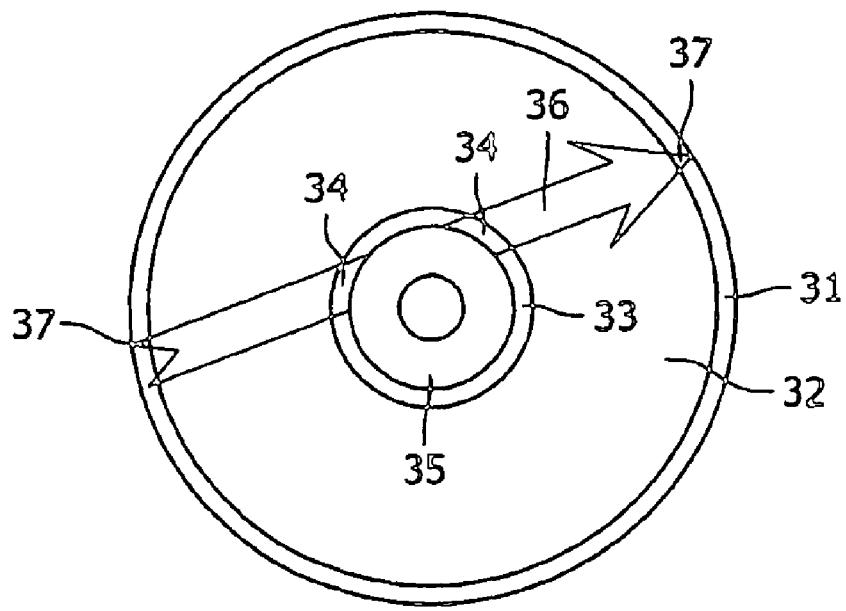
Figure 4:
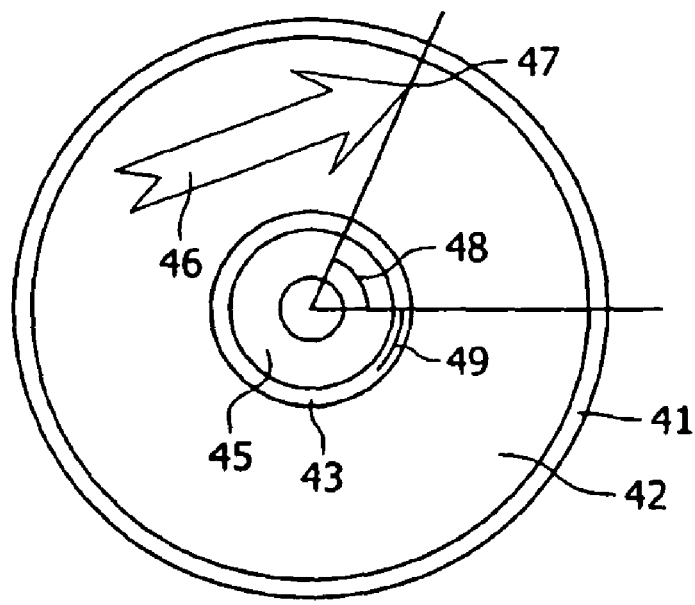
Figure 5:
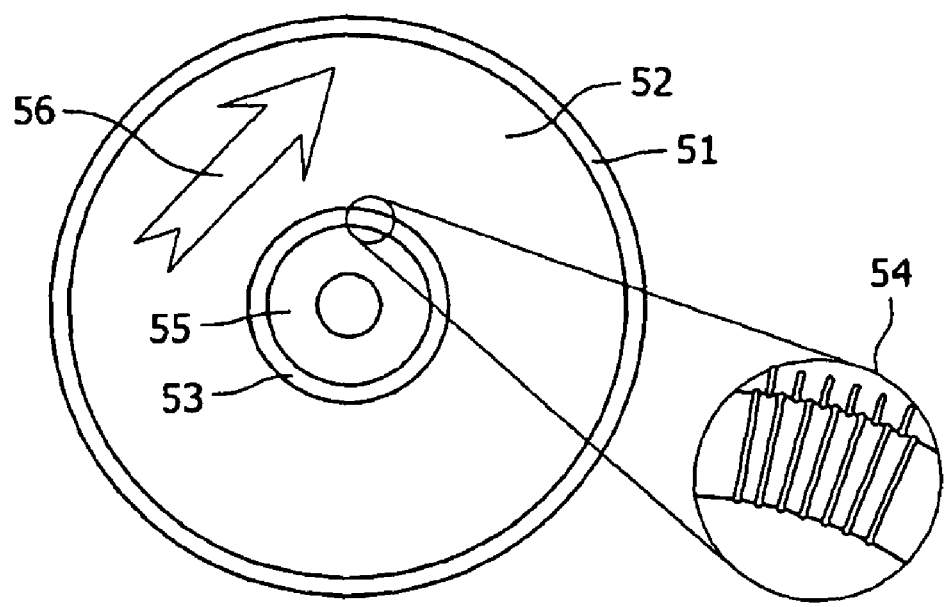

In the drawings:

FIG. 1 shows an embodiment of the process used for coding data and watermark information so as to be able to produce the record carrier according to the invention, FIG. 2 shows a first embodiment of the information carrier according to the invention, FIG. 3 shows a second embodiment of the information carrier according to the invention, FIG. 4 shows a third embodiment of the information carrier according to the invention, FIG. 5 shows a fourth embodiment of the information carrier according to the invention.

In FIG. 1, an embodiment of the process used for coding data and watermark information so as to be able to produce the record carrier according to the invention is shown. In this process, device 1 comprises an encoder 2 which receives the data 3 to be stored on the record carrier. In the encoder the data 3 is channel modulated in a channel modulator 5. The channel modulation used depends on the type of record carrier to be manufactured using the resulting master disc, e.g. the EFM+ channel code when DVD type discs are manufactured. In addition to the encoder, the device 1 comprises a position calculation unit 6 which, on the basis of graphical data 4 influences the channel modulation so as to introduce the first information on the record carrier. The record carriers in this embodiment are produced using a master disc obtained by controlling the Laser Beam Recorder (LBR) 8. In one implementation of this LBR, the channel modulator 5 is the "master" and steers the rotation of the LBR via the position calculation unit 6 using a tacho signal 10, in other implementation the LBR 8 is the "master" and is rotated autonomously; in this situation, the channel modulator has to determine real-time the angular position of the LBR, using zero pulses 11, in order to be able to provide the correct output to the LBR. Further, the channel modulated data obtained in the channel modulator 5 is used for steering the intensity 9 of the LBR. As, to a skilled person, the process of disc mastering is well-known, no detailed description of this process is given; only the details relevant for the present invention are repeated below.

Before or after mastering the data area of a record carrier, the second information is written in a non-data area of the record carrier, e.g. the inner-ring area This area is also called graphics band, text band, matrix band or identification band. For example, this graphics band can be defined as the area at a diameter between 39 and 46 mm. In order to write this text band, the Laser Beam Recording (LBR) 8 is set at a different (higher) track pitch than normally used when mastering the data area and is set in Constant Angular Velocity (CAV) mode. A pulse signal 11 is provided for indicating the start of the writing of the text in the text band; this pulse signal is given at the start of each turn and is used for writing the watermark information turn after turn. It must be noted that in this embodiment the LBR 8 is the "master", and the channel modulator 5 is the "slave". After writing the text band, the LBR 8 is set in Constant Linear Velocity (CLV) mode for mastering the data-area. Also in the data-area, a pulse signal is provided for indicating the start of the mastering of the data-area. A pulse signal is also given after the completion of each turn. For writing the complete watermark extending over both the data-area and the inner-ring area and/or the outer-ring area, the encoder present in the LBR has to be provided with a starting pulse at the begin of the text band and preferable the LBR is set in the same mode, CLV or CAV, throughout the mastering process. The content of these inner-ring and outer-ring areas can be treated as if it was the same content to be embedded in the data area. This time however, the way in which the information are written in these areas is different from the way the watermark image is written to a simple laser-on/laser-off method like is currently used for text ring recordings.

The resulting master disc 12 having both the first and the second information is than used for producing the record carriers 13 according to the invention.

In FIGS. 2-5, different embodiments of the record carrier according to the invention are shown. In FIG. 2, a record carrier in which the first information and second information are not orientated with respect to each other is shown. This record carrier consists of an outer graphics band 21, a data area 22, an inner graphics band 23 and a clamp area 25. The first information 26 is present in the data area 22 in the form of an arrow, the second information 24 is present in the clamp area 25. As shown in this picture, the resulting watermark in the form of an arrow does not exhibit a "continuous effect" over the complete area of the disc, as the arrow picture is interrupted when it crosses the non-data clamp area 25.

This in comparison to the embodiment shown in FIG. 3, where the arrow graphics extends over the outer graphics band 31, the data area 32 and the into the inner graphics band 34. The arrow is only interrupted by the clamping area 35. The first information in the data area 32 is indicated with 36, whereas the second information in the non-data areas (the inner graphics band 34 and the outer graphics band 31) are indicated with 34 and 37.

Another embodiment of the record carrier according to the invention is shown in FIG. 4. In this Figure, a record carrier having a watermark is shown. On this record carrier in addition to the watermarked arrow 47, further information is present. This information consists of the predetermined angle 48 between two references; one reference is the graphics reference 47 present in the watermarked area 42 and the other reference is the text reference 49 present in the inner graphics band 43. Instead of a text reference 49, any kind of reference can be used in the non-data area, e.g. in the mirror zone of the record carrier an alternating pattern of data areas and mirror areas can be used as a reference. This alternating pattern of data areas and mirror areas can also more generally be used as the second information forming the watermark together with the first information present in the data area. This angle information can be used for authentication purposes, e.g. in the case the algorithm for calculating the required predetermined run length distribution so as to introduce the watermark will be hacked.

Another embodiment is shown in FIG. 5. In the record carrier shown in this Figure, a combination of marks 54 in the inner graphics band 53 and watermark information 56 in the data area 52 is used. These marks present in the non-data area of the record carrier can also be used as position information so as to realise a predetermined orientation between the text/picture present in the data area and the text/picture present in the non-data area. These mark can be both visual and non-visual, e.g. only visible using microscopic aid.

After discussing different embodiments of the invention, it will be clear that the invention can be applied to be used for the following applications:

The watermark present can be used in an authenticity determination of the record carrier, preferably also using the predetermined angle between the different parts forming the watermark (e.g. the part present in the data area and the part present in the inner graphics band. In a more specific application, the predetermined angle can be the angular difference between the exact start angle of the watermark in the data area and the watermark in the inner text ring, or the outer text ring. This angular difference can be used as a key to identify the manufacturer of the record carrier. As explained before, the watermark can also be invisible, and therefore, micro text written in text bands can be used. Also a Product ID Code, in the form of a number, barcode, text, or small bitmap can be written via an LBR near the inner and/or outer edge of a disc.

From these applications, it will be clear that the main idea according to the invention is the combination of any kind of information present in existing non-data areas of a record carrier or to be stored therein with watermark information present in the data area. Additionally, tangential position information can be stored for use in additional authentication checks, e.g. in the angle between the watermark in the data area and text present in a non-data area.

Although the invention has been elucidated with reference to the embodiments described above, it will be evident that other embodiments may be alternatively used to achieve the same object. The scope of the invention is therefore not limited to the embodiments described above, but can also be applied to all kind of record carriers, both read-only and recordable/rewritable.

It should further be noted that use of the verb "comprises/comprising" and its conjugations in this specification, including the claims, is understood to specify the presence of stated features, integers, steps or components, but does not exclude the presence or addition of one or more other features, integers, steps, components or groups thereof. It should also be noted that the indefinite article "a" or "an" preceding an element in a claim does not exclude the presence of a plurality of such elements. Moreover, any reference sign does not limit the scope of the claims; the invention can be implemented by means of both hardware and software, and several "means" may be represented by the same item of hardware. Furthermore, the invention resides in each and every novel feature or combination of features.

In summary, the invention relates to a record carrier comprising a data area for storing data in the form of marks, in which the data is encoded by means of a channel code, wherein a parameter of the channel code is controlled so as to introduce a predetermined run length distribution in the marks on the record carrier, thereby introducing first information relating to a watermark, and a non-data area comprising second information relating to a watermark, the first and the second information forming the watermark. This watermark, extending over both the data-area and the inner-ring area and/or the outer-ring area, can be used for checking the authenticity of the record carrier and/or the recordings made on this record carrier. The invention also relates to a method of providing a watermark on the record carrier, and a device for providing a watermark on a record carrier.

The invention claimed is:

1. A non-transitory computer readable memory medium comprising:
    a data area for storing data in the form of marks, in which the data is encoded by means of a channel code, wherein a parameter of the channel code is controlled so as to introduce a predetermined run length distribution in the marks on the computer readable memory medium, thereby introducing first information relating to a visually discernable watermark, wherein at least a portion of the first information is visually discernable on the computer readable memory medium in the data area without a device to discern the first information, and
    a non-data area comprising second information relating to the visually discernable watermark, wherein at least a portion of the second information is visually discernable on the computer readable memory medium in the non-data area without a device to discern the second information,
    the first and the second information together forming the visually discernable watermark, wherein the visually discernable watermark is visually discernable on the computer readable memory medium without a device discerning the visually discernable watermark.

2. The computer readable memory medium as claimed in claim 1, wherein the first and the second information forming the visually discernable watermark are visually aligned on the computer readable memory medium with respect to each other without a device to discern the visual alignment.

3. The computer readable memory medium as claimed in claim 2, wherein the first and the second information is visually orientated on the computer readable memory medium with respect to each other, without a device to discern the visual orientation, using position information present in the non-data area.

4. The computer readable memory medium as claimed in claim 2, wherein the computer readable memory medium further comprises angle information indicating a visually discernable predetermined angle on the computer readable memory medium without a device to discern the predetermined angle between the first information and the second information.

5. The computer readable memory medium as claimed in claim 4, wherein the visually discernable predetermined angle is used as authentication information.

6. The computer readable memory medium as claimed in claim 1, wherein the non-data area is both of an inner-ring area and an outer-ring area and wherein the visually discernable second information is visually discernable on the computer readable memory medium in both the inner-ring area and the outer-ring area without a device to discern the visually discernable second information.

7. The computer readable memory medium as claimed in claim 1, wherein the non-data area is a visually discernable graphics band, a visually discernable text band, a visually discernable matrix band or a visually discernable identification band that is visually discernable on the computer readable memory medium without a device.

8. The computer readable memory medium as claimed in claim 1, wherein the second information comprises at least one of picture and text information that is visually discernable on the computer readable memory medium without a device.

9. The computer readable memory medium as claimed in claim 1, the data area comprising a pattern of substantially parallel tracks that is visually discernable on the computer readable memory medium without a device, wherein the predetermined run length distribution is correlated from track to track, so that the first information is visually detectable.

10. The computer readable memory medium as claimed in claim 1, wherein a portion of the first information is non-visually detectable.

11. The computer readable memory medium as claimed in claim 1, in which the channel code is the EFM channel code as used for the CD Digital Audio disc, wherein the parameter is the choice of merging bits.

12. The computer readable memory medium as claimed in claim 1, wherein the parameter is the choice between channel words for information words from alternative tables, for example, information words 1 up to and including 88 in the EFM+ channel code as used in DVD, or the choice between sync words or the choice between states.

13. A method of providing a watermark on a computer readable memory medium, the method comprising acts of:
    receiving uncoded data,
    receiving first information relating to the watermark, which first information is to be provided in the encoded data,
    receiving second information relating to the watermark, which second information is to be provided in a non-data area,
    encoding the uncoded data to encoded data by means of a channel code, in which a parameter of the channel code is controlled under the influence of the first information relating to the watermark for introducing a predetermined run length distribution in the marks on the computer readable memory medium,
    storing the encoded data on the computer readable memory medium to render the watermark visually discernable in a data area, wherein at least a portion of the encoded data is visually discernable on the computer readable memory medium in the data area without a device to discern the portion of the encoded data,
    storing the second information in the non-data area to render the watermark visually discernable in the non-data area on the computer readable memory medium, wherein the watermark is visually discernable on the computer readable memory medium without a device discerning the watermark.

* * * * *